United States Patent [19]

Parkinson

[11] Patent Number: 4,536,979
[45] Date of Patent: Aug. 27, 1985

[54] RECORD JACKET FRAME PERMITTING RECORD REMOVAL

[75] Inventor: Delbert J. Parkinson, Box 771, CECOM, FPO Seattle, Wash. 98773

[73] Assignees: Delbert J. Parkinson; William W. Haefliger, both of Pasadena, Calif.; a part interest

[21] Appl. No.: 314,675

[22] Filed: Oct. 26, 1981

[51] Int. Cl.³ .............................................. G09F 1/10
[52] U.S. Cl. .......................................... 40/159; 40/16; 40/124.2
[58] Field of Search ............ 40/124, 124.2, 152, 40/154, 159, 16; 211/49, 51, 159, 152

[56] References Cited

U.S. PATENT DOCUMENTS

| | | | |
|---|---|---|---|
| 1,904,318 | 4/1933 | Lehere | 40/154 |
| 2,336,196 | 12/1943 | Sparling | 40/154 |
| 3,069,795 | 12/1962 | Lieberman | 40/152 |
| 3,676,942 | 7/1972 | Elrod | 40/124.2 |
| 3,711,978 | 1/1973 | Conrad | 40/152 |
| 4,348,826 | 9/1982 | Reim | 40/156 |

FOREIGN PATENT DOCUMENTS 1201649  1/1960  France ................. 40/152

Primary Examiner—Gene Mancene
Assistant Examiner—Wenceslao J. Contreras
Attorney, Agent, or Firm—William W. Haefliger

[57] ABSTRACT

A frame for a record jacket facilitates partial or complete removal of the jacket from the frame for withdrawal of the record disc to be played, and complete return of the jacket, all in an easy rapid manner. Hanging of such frames, singly or in groups, is also enabled.

3 Claims, 7 Drawing Figures

U.S. Patent   Aug. 27, 1985   4,536,979
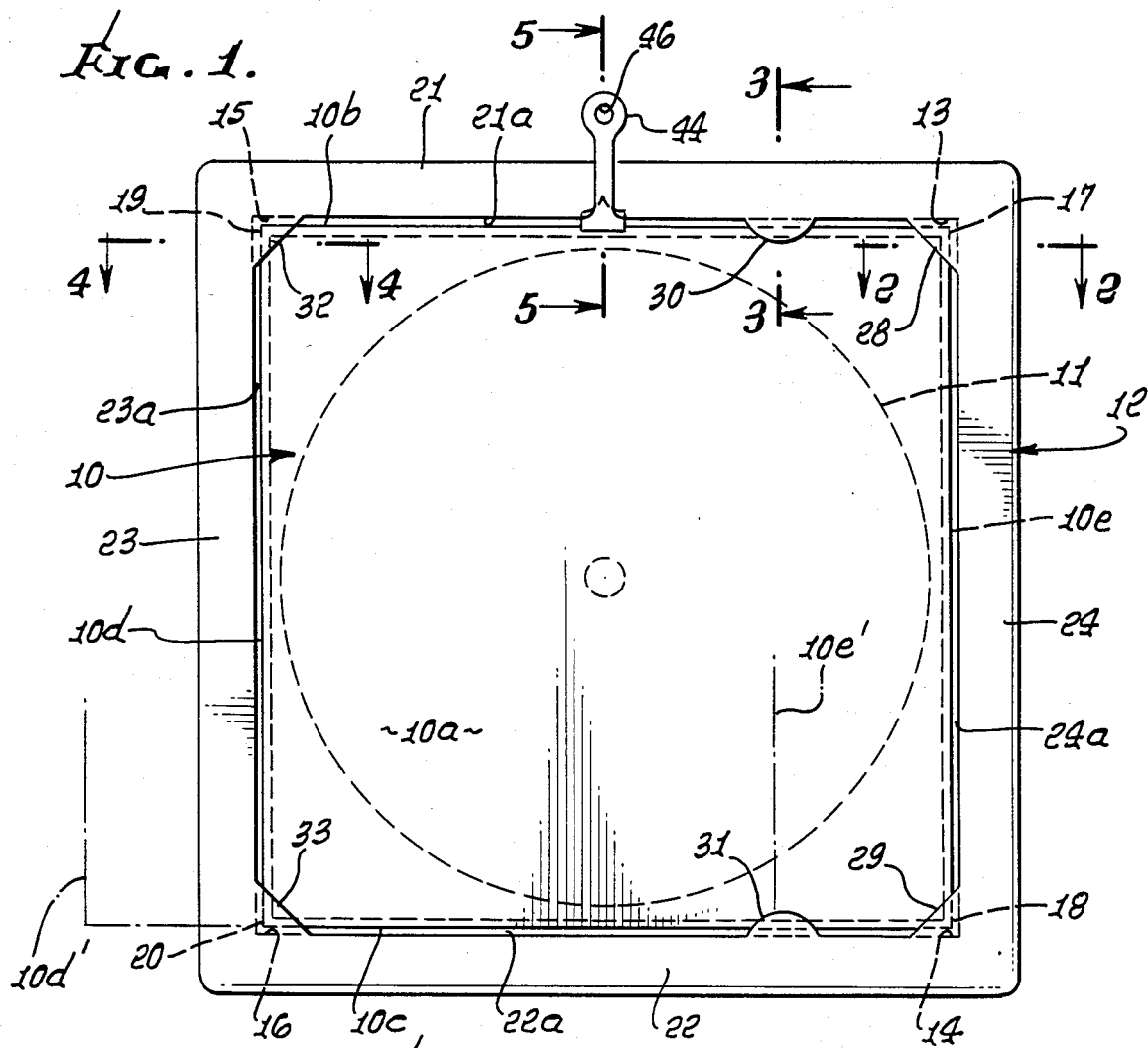
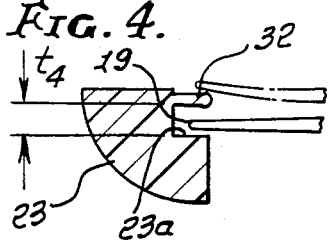
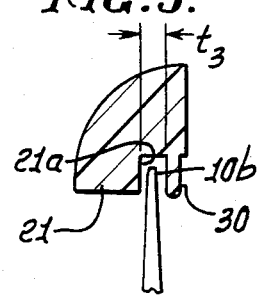
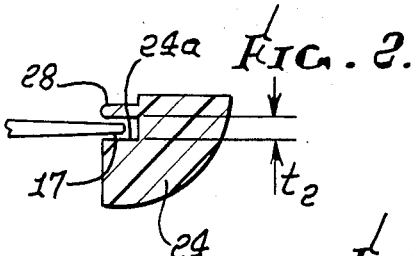
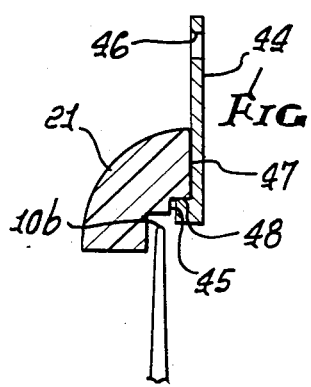
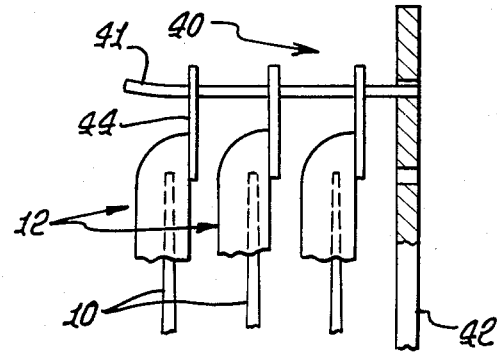
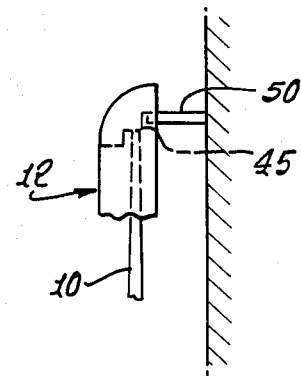

RECORD JACKET FRAME PERMITTING RECORD REMOVAL

BACKGROUND OF THE INVENTION

This invention relates generally to display of phonograph record jackets or sleeves, and more particularly concerns framing of such jackets.

Record jackets typically bear attractive or attention getting pictures on their front faces. Storage of such jackets for display purposes to attract sales is of prime importance in record stores; also users frequently desire a prominently display record jackets which they have purchased. Framing of such jackets is one method to give them prominence; however, frames block easy access to the records in the jackets.

SUMMARY OF THE INVENTION

It is a major object of the invention to provide a solution to the above problem and to meet the described need. Basically, the invention allows framing of a record jacket in a simple, inexpensive, attractive manner, while still permitting easy access to the record in the jacket, whenever desired. Basically, structure is provided on the frame to support the jacket so that it may have:

(i) a first position in which the jacket is completely bordered by the frame and retained thereto, and
(ii) a second position in which an open end of the jacket projects free of the frame to provide easy access to the record in the jacket, while the remainder of the jacket is slidably retained to the frame.

More specifically, primary holder means is typically provided on the frame to guide jacket longitudinal sliding movement generally parallel relative to the frame to display first and second jacket corners into first and second positions of reception and retention in first and second corners respectively of the frame. Also, secondary holder means is typically provided on the frame to interfere with displacement of third and fourth jacket corners into and out of third and fourth positions of reception and retention in third and fourth corners respectively of the frame, and located to permit forcible flexible displacement of the third and fourth jacket corners past said second holder means into and out of said third and fourth positions when the jacket first and second corners are in said first and second positions, whereby the jacket third and fourth corners may be displaced out of said third and fourth positions and the jacket slidably moved to displace the jacket first and second corners out of said first and second positions allowing edgewise insertion or removal of a record disc into or out of the jacket.

In addition, removable support means may be provided on the frame to allow multiple frames and associated jackets to be suspended, as for example on a common hook or pin, for display purposes, and also to allow individual frames to be supported on walls, without the support means showing.

These and other objects and advantages of the invention, as well as the details of an illustrative embodiment, will be more fully understood from the following description and drawings, in which:

DRAWING DESCRIPTION

FIG. 1 is a rear elevation showing a record jacket installed in a frame;

FIGS. 2, 3, 4 and 5 are enlarged sections taken on lines 2—2, 3—3, 4—4 and 5—5 of FIG. 1;

FIG. 6 is a fragmentary end elevation showing multiple frames and associated record jackets supported by a peg board pin; and FIG. 7 is a fragmentary end elevation showing a frame and associated record jacket supported by a picture hook or pin.

DETAILED DESCRIPTION

In the drawings, a phonograph record jacket or sleeve of standard size, is shown at 10, and typically consists of resiliently flexible cardboard or equivalent material. A phonograph record 11 is removably received by the jacket via end 10d thereof. The front face of the jacket typically consists of a picture of the artist or other striking scene, and it desired to enhance that view as by removably framing the jacket, and in such manner that access to the record may be easily had at all times.

A frame 12 is provided to define recessed corners 13–16 for reception of jacket corners 17–20, respectively. To this end, the frame typically includes two longitudinally extending members 21 and 22 interconnected by two laterally extending members 23 and 24 at junctions which define the recessed corners. Associated with these members are elongated recessed ledges 21a–24a to support edge portions of the jacket. The frame may consist of synthetic resinous or plastic material, or wood, or other substance, but is preferably lightweight and inexpensive.

In accordance with the invention, structure on the frame supports the jacket to have (i) a first position in which the jacket is completely bordered by the frame, and retained thereto, and
(ii) a second position in which an open end of the jacket projects free of the frame to provide easy access to the record in the jacket, while the remainder of the jacket is slidably retained to the frame.

More specifically, primary holder means is provided on the frame to guide jacket longitudinal sliding movement generally parallel relative to the frame to displace first and second jacket corners into first and second positions of reception and retention in first and second corners respectively of the frame. Also, secondary holder means is provided on the frame to interfere with displacement of third and fourth jacket corners into and out of third and fourth positions of reception and retention in third and fourth corners respectively of the frame, and located to permit forcible flexible displacement of the third and fourth jacket corners past said second holder means into and out of said third and fourth positions where the jacket first and second corners are in said first and second positions, whereby the jacket third and fourth corners may be displaced out of said third and fourth positions and the jacket slidably moved to displace the jacket first and second corners out of said first and second positions allowing edgewise insertion or removal of a record disc into or out of the jacket.

In the drawings, the frame first and second interior corners are shown at 13 and 14, and the jacket exterior first and second corresponding corners appear at 17 and 18. Also, the frame third and fourth interior corners appear at 15 and 16, and the jacket exterior third and fourth corresponding corners appear at 19 and 20. The frame corners may be slightly oversized in relation to the jacket corners so that the latter may be loosely received in their respective first through fourth positions in the frame corners as shown in FIG. 1, and shiftable in directions parallel to the plane of the jacket.

As shown in FIGS. 1 and 2, the primary holder means includes first and second tabs 28 and 29 at the frame first and second corners, to overlie the jacket first and second corners in their first and second received positions. Such tabs may be integral with the frame members 21 and 24, and 22 and 24, gaps $t_2$ being formed between the tabs and the recessed frame member shoulders, as at 24a and 22a. The primary holder means may also include auxiliary tabs 30 and 31 on the frame longitudinal lengths 21 and 22 to guide longitudinal sliding movement of edge portions 10b and 10c. Tabs 30 and 31 may also be integral with the frame members 21 and 22 and extend inwardly beyond the inner edges of ledges 21a and 22a, to positively retain the jacket edge portions 10b and 10c during their longitudinal back and forth sliding movement. Note the fully retained position in FIG. 1, with jacket edge 10d overlying support ledge 23a, and edge position 10d' pulled free of that ledge (to allow access to a record in the jacket via an opening in edge 10d). The opposite edge of the jacket appears in two positions at 10e and 10e', in FIG. 1, corresponding to the two positions 10d and 10d'. Tabs 30 and 31 are spaced by gaps $t_3$ from ledges 21a and 22a gaps $t_3$ being about the same as gaps $t_2$, and sufficiently small as to hold the jacket edge portions close to the ledges while permitting free sliding of the jacket, in the plane thereof and slight bending of the jackets to overlie frame member 23 in the second position of the jacket indicated by edge 10d'. Tabs 30 and 31 are preferably closer to corners 13 and 14 than to corners 15 and 16, to accommodate such jacket and record flexures.

The secondary holder means referred to above may advantageously comprise third and fourth tabs 32 and 33 at the frame third and fourth corners 15 and 16. Those tabs have edges past which the jacket corners 19 and 20 may be resiliently snap-deflected, into and out of third and fourth positions as referred to above and as illustrated in FIG. 4. FIG. 1 shows the diagonal edge of tab 32 as extending at about 45° relative to the jacket edges 21a and 23a, and the diagonal edge of tab 33 as extending at about 45° relative to the jacket edges 22a and 23a, to help facilitate the snap-deflection referred to. Note in FIG. 4 the gap $t_4$ between each of the tabs 32 and 33 and the ledge 23a, that gap width $t_4$ being substantially greater than the retention gaps $t_2$ and $t_3$, and that enhanced gap width ($t_4$) also facilitating ease of snap-deflection as referred to.

In use, the jacket corners 19 and 20 are downwardly snapped over tabs 32 and 33, as indicated in FIG. 4, to be received and retained in the gaps of greater width $t_4$, during times that the frame and jacket are suspended, as will be referred to, gaps $t_2$ and $t_3$ holding the jacket close to the frame ledges 21a–24a. To gain access to a record in the jacket, jacket corners 19 and 20 are snapped upwardly out of those gaps $t_4$, and the jacket slid or shifted to edge position 10d', free of the frame member 23, at which time the record may be easily accessed and removed. Note that gaps $t_3$ retain the jacket at this time, but gaps $t_2$ are free of the record jacket corners 17 and 18. A reverse sequence occurs when the record is restored to the jacket and the jacket re-framed, with corners 17–20 retained in gaps $t_2$ and $t_4$.

A support means, as at 40, is employed to support the frame and jacket, as on a peg-board hook. (See FIG. 6 showing multiple frames 12 and jackets supported on a hook or pin 41 carried by a peg-board 42). Such support means comprises a tab 44 retained by a notch 45 in the upper frame member 21, and projecting outwardly and upwardly, there being a through opening 46 in that tab to receive the pin. The tab may be removably retained at the notch, as by loose bonding or other connection at interfaces 47 and 48 shown in FIG. 5. After a displayed frame and jacket is purchased by a buyer, he or she may hang it on a picture hook or pin 50 (see FIG. 7) after the tab 44 is pulled free of the frame and notch, and the latter applied over the pin.

I claim:

1. For use in combination with a phonograph record jacket which is rectangular and has resiliently flexible corners, the combination comprising
   (a) a rectangular frame having corners located to receive jacket corners,
   (b) primary holder means on the frame to guide jacket longitudinal sliding movement generally parallel relative to the frame to displace first and second jacket corners into first and second positions of reception and retention in first and second corners respectively of the frame,
   (c) and secondary holder means on the frame to interface with displacement of third and fourth jacket corners into and out of third and fourth positions of reception and retention in third and fourth corners respectively of the frame, and located to permit forcible flexible displacement of the third and fourth corners past said secondary holder means into and out of said third and fourth positions where the jacket first and second corners are in said first and second positions, whereby the jacket third and fourth corners may be displaced out of said third and fourth positions and the jacket slidably moved to displace the jacket first and second corners out of said first and second positions allowing edgewise insertion or removal of a record disc into or out of the jacket,
   (d) said primary holder means including first and second tabs at said first and second frame corners to overlie the jacket first and second corners in said first and second positions thereof,
   (e) said primary holder means also including auxiliary tabs on frame longitudinal lengths extending in the direction of said jacket sliding movement in spaced relation to the frame corners to overlie and guide longitudinal edge portions of the jacket,
   (f) said primary holder means including third and fourth tabs at said frame third and fourth corners and having edges past which the jacket third and fourth coreners may be resiliently snap-deflected, into and out of said third and fourth positions,
   (g) and including said record jacket having said first, second, third and fourth corners retained by the frame at said frame first, second, third and fourth corners, respectively, lengthwise edge extent of the jacket also being retained by said auxiliary tabs,
   (h) said auxiliary tabs located closer to said first and second tabs, respectively, than to said third and fourth tabs, respectively, one auxiliary tab located between the first and third tabs, and the other auxiliary tab located between the second and fourth tabs,
   (i) said frame having elongated ledges at the rear side thereof to register with jacket elongated edge portions when the jacket corners are displaced into said first through fourth positions, said first through fourth tabs being oversize relative to the jacket corners and extending diagonally relative thereto so that the jacket corners may be loosely received in said first through fourth positions, in directions parallel to the plane of the jacket, (j) the frame including two longitudinally extending members interconnected by two laterally extending members, and including support means on one of the longitudinally extending members for hanging the frame on a carrier.

2. The combination of claim 1 including said carrier engaging said support means.

3. The combination of claim 1 wherein said support means comprises a tab retained at a notch in said one member and projecting outwardly relative thereto, the tab having a through opening to receive said carrier.

* * * * *